Patented May 11, 1954

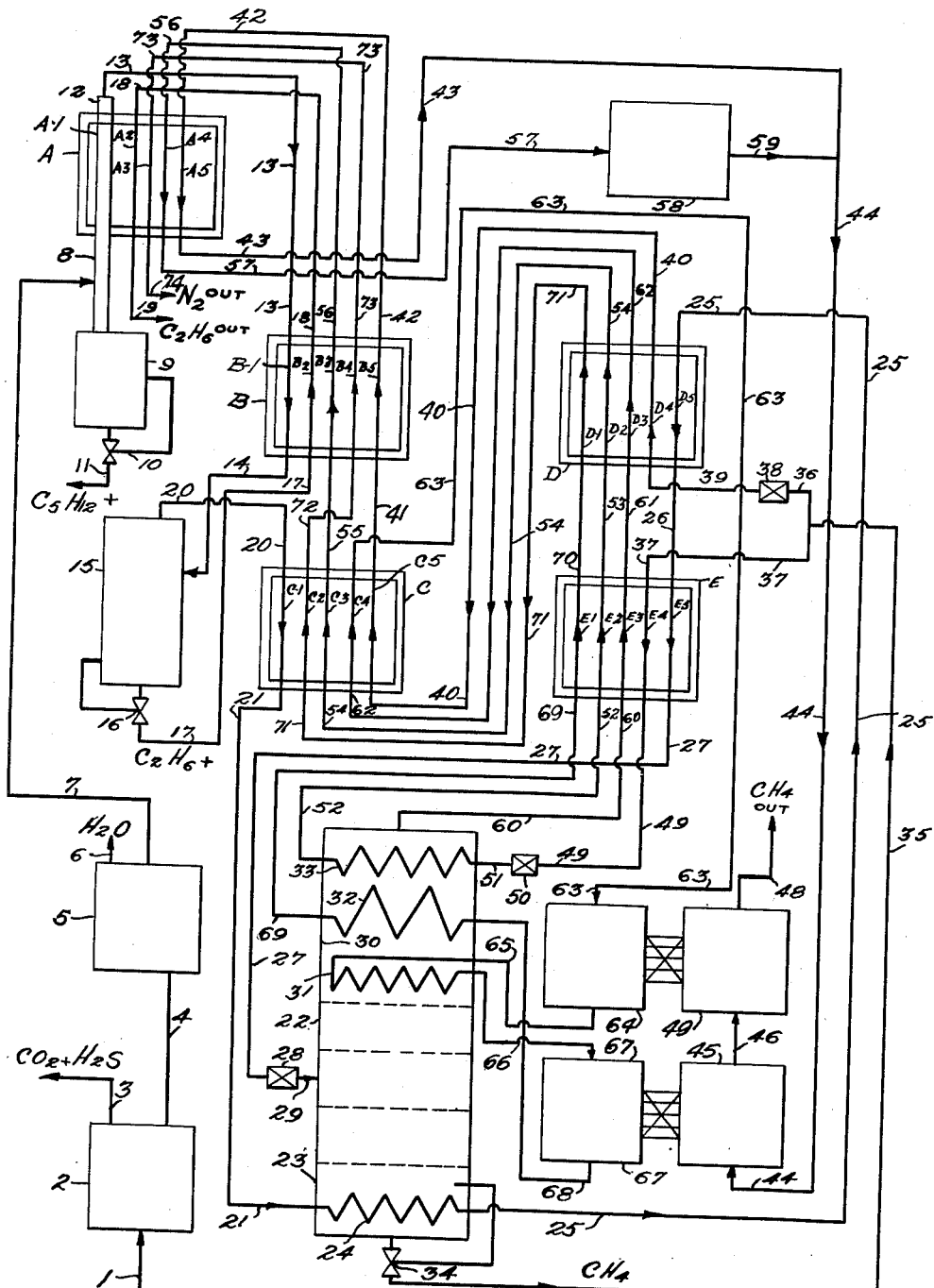

2,677,945

UNITED STATES PATENT OFFICE 2,677,945

TRANSPORTATION OF NATURAL GAS

Benjamin Miller, Ozone Park, N. Y., assignor to The Chemical Foundation, Incorporated, a membership corporation of New York Application January 21, 1948, Serial No. 3,518

7 Claims. (Cl. 62—175.5)

This invention relates to the transportation of natural gas.

A primary object of the invention is to reduce the cost of long-distance transportation of the fuel value of natural gas by removing from the natural gas the non-combustible nitrogen. The present application is a continuation-in-part of application Serial No. 668,094, filed May 8, 1946, and is concerned with improvements in the methods disclosed in the earlier application, particularly with regard to the yield obtained in the separation process.

The method of separation which is employed involves the liquefaction of at least a substantial portion of the natural gas and the separation of a vapor containing substantially all of the nitrogen from a liquid substantially free from nitrogen. As pointed out in the copending application, the nitrogen-rich fraction may in some cases contain an appreciable percentage of methane. When the separation takes place at a location where the fuel value of the nitrogen-rich fraction may be economically utilized, there is no need to improve the yield of fuel value. But when the separation takes place at a location where the demand for fuel is relatively small, there is an advantage in reducing the methane content of the nitrogen-rich fraction. Such reduction is a particular object of the present invention.

The invention will be explained with the aid of the accompanying drawing, which is a flow sheet showing a modification of the separation process to be preferred when the methane content of the nitrogen-rich fraction is to be minimized. The natural gas may be first treated for the extraction of natural gasoline, butane, and propane, if desired, but if the amount of pentanes and higher hydrocarbons is relatively small preliminary treatment is not necessary.

The natural gas mixture to be treated, comprising methane and nitrogen, with some higher hydrocarbons, will generally contain water, frequently contain a small amount of carbon dioxide, and occasionally contain a small amount of hydrogen sulfide. This mixture enters the process through line 1. The first step is the removal of carbon dioxide and hydrogen sulfide, if any be present. This, as shown, is carried out in an amine treating system 2. If desired, the amine solution may be mixed with a high-boiling glycol, such as diethylene glycol or propylene glycol, so that water and acidic components are removed simultaneously. If the natural gas is sweet, and if the carbon dioxide content is small enough so that the solubility of carbon dioxide in the liquid hydrocarbons later condensed is not exceeded, the step of removing acidic components may be omitted. However, in the flowsheet acidic components are removed and leave through line 3.

The treated gas is then passed through line 4 into drying system 5. The drying system may be of any suitable type such as a liquid scrubbing system using a high-boiling glycol or other suitable material, or a dry-mass system, using a solid adsorbent such as activated alumina, or a liquid scrubbing system followed by a dry mass system. The water removed is disposed of through line 6 and the dry gas proceeds through line 7 into line 8.

Line 8 leads into passage A-1 of the five-passage heat exchanger A. The gas passes vertically up through passage A-1, and is cooled, with partial condensation. The condensate runs down passage A-1, then down line 8 into separator 9. It will be understood that the temperature progressively decreases in going up through passage A-1, so that the condensate which forms and runs down moves in the direction of higher temperatures. The counter-current flow of liquid and gas and the progressive temperature change result in fractionation, so that the liquid which collects in separator 9 is enriched in the less volatile components. When enough liquid accumulates in separator 9 to reach the selected level, liquid level controller 10 allows the liquid to pass out through line 11 to a natural gasoline stabilizer not shown.

The refrigerating effect available for condensing in heat exchanger A is relatively small, so that only a small amount of liquid may be withdrawn. By arranging the flows so that fractionation and cooling occur together, I am enabled to direct the refrigerating effect available for condensing to condensation of the least volatile material, the pentanes and higher hydrocarbons, thereby obtaining the maximum yield of this more valuable hydrocarbon liquid and lowering as much as possible the hydrocarbon dew point of the gas leaving A-1.

It will be noted that heat exchanger A has 5 passages, indicated by A-1, A-2, A-3, A-4, and A-5. Passage A-1 is shown somewhat differently on the diagram from the others. This is only for convenience in pointing out that there are flows through passage A-1 in both directions, the gas rising and the liquid descending.

From passage A-1 the gas rises into line 12, which may be fitted with a device, not shown, for returning entrained liquid to passage A-1. Line 12 connects with line 13, which leads the gas to passage B-1 of the five passage heat exchanger B. In passing through B-1 the gas is further cooled, and partially condensed. The mixture of liquid and vapor formed leaves B-1 through line 14, which discharges into separator 15. The liquid formed in B-1 and separated in 15 comprises substantially all of the ethane and higher hydrocarbons which were in the natural gas entering the process and which were not removed by passage through A-1. It will be apparent that if the natural gas to be treated has, when produced, no appreciable content of pentanes and higher hydrocarbons, or if natural gasoline extraction treatment has been substantially complete, it may be desirable to omit heat exchanger A and its associated separator, etc., in which case line 8 will lead directly to B-1.

The process is so operated and the temperatures and pressures so adjusted with respect to the composition of the gas to be treated as to cause the liquid separated in 15 to contain a substantial portion of the methane which was in the original natural gas, but very little of the nitrogen.

When enough liquid accumulates in separator 15 to reach the selected level, liquid level controller 16 allows the liquid to pass out through line 17 and flow through passage B-2. Here the liquid evaporates, and the vapor formed passes through line 18 to passage A-2, in heat exchanger A. The gas is further warmed by passing through A-2, which it leaves by way of line 19, which leads it to the transportation system, usually to the inlet of a compressor not shown. The pressure in line 19 is maintained at a value substantially lower than the pressure in 15, and the pressure in B-2 is correspondingly lower than the pressure in B-1. This makes it possible for the liquid evaporating in B-2 to abstract the heat from the vapor condensing in B-1.

The vapor separated in 15 contains substantially all of the nitrogen which was in the original natural gas, a substantial portion of the methane, and very little of the ethane. It leaves 15 through line 20 which leads to passage C-1 of the five-passage heat exchanger C. In passing through C-1 the temperature is lowered, and a small amount of condensation takes place. From C-1 line 21 leads the mixture to reboiler coil 24, enclosed in reboiler section 23 of fractionator 22. In passing through reboiler coil 24 the mixture is further cooled, and a substantial portion of it is liquefied. From reboiler coil 24 the mixture flows through line 25 to passage D-5 of five-passage heat exchanger D. In passing through D-5 liquefaction is substantially completed. From D-5 the liquid and any small amount of remaining gas flow through line 26, which leads to passage E-5 of five-passage heat exchanger E. The liquid is cooled in passing through E-5, then flows through line 27 to pressure controller 28, which allows it to flow at a controlled rate through line 29 into fractionator 22. The pressure in fractionator 22 is maintaned at a value substantially lower than the pressure in line 27, and the function of 28 is to consume the differential. Thus the pressure in reboiler coil 24 is correspondingly higher than the pressure in reboiler section 23, which enables condensation to take place within 24 while evaporation is taking place outside 24 but within 23.

Fractionator 22 also has a reflux condensing section 30 enclosing reflux coils 31, 32 and 33. Heat is added to the material within fractionator 22 in the reboiler section, and heat is removed from the material within fractionator 22 in the reflux condensing section, whereby a temperature gradient is maintained in 22, the temperature increasing progressively from top to bottom. Fractionation takes place, and the mixture introduced through line 29 is divided into a liquid which accumulates in 23 and a vapor which leaves 22 by way of 30. When the accumulation of liquid in 23 reaches a selected level, liquid level controller 34 allows this liquid to flow out of 23 through line 35. This liquid is substantially pure methane, practically all of the nitrogen being caused to rise into the vapor. As described in my copending application, the freedom of the liquid from nitrogen is obtained by controlling the temperature in 23 so that it is not lower than the boiling point of methane at the prevailing pressure. The prior removal of ethane and higher hydrocarbons facilitates this control.

The liquid methane flowing through line 35 is brought to the junction of lines 36 and 37. Part flows through line 36 to pressure controller 38, then through line 39 and through passage D-4 of heat exchanger D. The pressure in line 39 is maintained at a value substantially lower than the pressure in line 36, this being the function of 38 which consumes the differential. The pressure in D-4 is correspondingly lower than the pressure in D-5, which makes it possible for the methane to evaporate in D-4 while a mixture of methane and nitrogen is condensing in D-5.

It will be noted that the pressure of the natural gas entering the process is substantially maintained on the mixture up to pressure controller 28, the only pressure drop being the drop through the lines and heat exchangers. Then there is a substantial drop in pressure to the fractionation pressure. This pressure is substantially maintained up to pressure controller 38, where there is another substantial drop in pressure. Thus the difference between the pressure at which the mixture is condensed and the pressure at which the liquid methane evaporates, necessary to recover the regenerated refrigeration as described in my copending application, is divided in the present invention into two parts. There is first the pressure drop imposed by pressure controller 28, between the condensing pressure of the mixture and the evaporating pressure of the liquid methane within the fractionator. Second is the pressure drop imposed by pressure controller 38, between the evaporating pressure of the liquid methane within the fractionator and the evaporating pressure of the methane outside the fractionator.

By this method I may control the condensation of the mixture, as to what portion condenses within the reboiler coil 24 and what portion remains to be condensed within D-5, since the mixture condenses at constant pressure over a range of temperatures, there being a substantial temperature difference between the beginning and end of condensation.

As pointed out in my copending application, the nitrogen-rich vapor rising from the fractionation may under some circumstances contain a substantial fraction of methane. The present invention is directed toward reducing the amount of methane which leaves with the nitrogen, and the use of a fractionation pressure controlled at a selected value between the condensing pressure of the mixture and the evaporation pressure of the methane outside the fractionator is an important feature for this purpose.

The methane leaves D-4 through line 40, which brings it to passage C-5 in five passage heat exchanger C. In passing through C-5 the methane is warmed. From C-5 the methane passes through line 41, passage B-5, line 42, and passage A-5, being progressively warmed. From A-5 the methane flows through lines 43 and 44 to compressor 45, from which it flows through line 46 to compressor 47. The methane leaves compressor 47 through line 48 for the transportation system, usually flowing to the inlet of a compressor not shown.

Returning to line 35 at the junction of lines 36 and 37, the portion of the liquid methane which flows through line 37 passes through passage E-4, in which it is cooled. Then it passes through line 49 to pressure controller 50, thence through line 51 into reflux coil 33. The pressure in line 49 is but slightly lower than the pressure in 23, due to drop through lines and exchanger passage E-4, but the pressure in line 51 is maintained at a value substantially lower than the pressure in line 49, the function of controller 50 being to consume the differential. There is a corresponding difference between the pressure within reflux coil 33 and the pressure outside of 33 but within 30. By reason of this pressure difference methane can boil within coil 33 to condense nitrogen or a nitrogen-rich mixture outside of coil 33 and within reflux condenser section 30.

The methane vapor leaves coil 33 through line 52, and passes through passage E-2, line 53, passage D-2, line 54, passage C-3, line 55, passage B-3, line 56, and passage A-4, being progressively warmed. From A-4 the methane passes through line 57 to compressor 58, which raises its pressure sufficiently so that it may pass through line 59 to reunite with the other portion of methane which it left at the junction of lines 36 and 37.

Returning now to fractionator 22, the nitrogen-rich vapor leaves the reflux condenser section thereof through line 60 and passes through passage E-3, line 61, passage D-3, line 62, and passage C-4, being progressively warmed. From C-4 the gas passes through line 63 to expander 64. In passing through expander 64 the gas cools, giving up energy which drives compressor 47. The cold exhaust from expander 64 passes through line 65 to reflux coil 31, and from reflux coil 31 through line 66 to expander 67. In passing through reflux coil 31 the nitrogen-rich fraction is reheated by abstracting heat from the materials being fractionated in 22. Expansion through 67 causes the gas to cool and to give up energy to drive compressor 45. From 67 the gas passes through line 68, coil 32, line 69, passage E-1, line 70, passage D-1, line 71, passage C-2, line 72, passage B-4, line 73, and passage A-3, being progressively warmed. From A-3 the nitrogen-rich gas is discharged to the atmosphere or passes to the plant fuel system through line 74, depending upon the value and demand for fuel at the location, and its fuel value.

Since a particular object of the present invention is to reduce the methane content of the nitrogen-rich fraction, the temperatures and pressures are adjusted to accomplish that object, consistent with substantially complete removal of nitrogen from the gas to be transported for a long distance and with minimum drop in pressure through the system.

I prefer to operate the fractionator at a high pressure, in the range 400 to 600 p. s. i.; however, when the methane content of the nitrogen-rich fraction is to be kept to a very low value the fractionation will be carried out at the low side of the range, or slightly below 400 p. s. i. a., and generally not over 450 p. s. i. a. The pressure maintained on the natural gas during the cooling steps may be 50 to 300 p. s. i. a. higher than the fractionation pressure, usually about 200 p. s. i. higher. The pressure maintained on that portion of the methane which is evaporated to provide reflux for the fractionator may be as low as 20 p. s. i. a. when a nitrogen-rich fraction substantially free from methane is required, but will generally be in the range 40 to 120 p. s. i. a., and not higher than 150 p. s. i. a. The pressure maintained on the other portion of methane during its evaporation will range from just less than the fractionation pressure as a maximum to half the pressure maintained on the methane-nitrogen mixture during condensation as a minimum.

The liquid containing most of the ethane will generally be evaporated under a pressure 100 to 200 p. s. i. less than the pressure maintained on the natural gas during the cooling step.

As a numerical example of the pressures employed, the natural gas may enter the process at 640 p. s. i. a., which pressure is substantially maintained during the condensation; the liquid containing the bulk of the ethane may be evaporated under a pressure of 500 p. s. i. a.; the fractionation of the mixture may take place under a pressure of 440 p. s. i. a.; the methane evaporated to provide reflux may be evaporated under a pressure of 100 p. s. i. a.; and the other portion of methane may be evaporated at 350 p. s. i. a.

The temperature at which the natural gas enters the process should be as low as can be conveniently obtained by means of available cooling water. The separation of the liquid containing the bulk of the ethane will take place at a temperature in the range −100 to −120 degrees Fahrenheit, generally, depending upon the composition and the pressure employed. The lower the temperature at which this separation takes place, the more methane in the liquid, and the smaller the volume of gas which must be further processed. This is advantageous, as is the fact that the nitrogen concentration of the gas to be further processed is increased, which makes the subsequent separation easier. On the other hand, the lower the temperature at which the liquid containing the bulk of the ethane is separated, the greater the nitrogen concentration in this liquid. One variation is to cool the mixture to a temperature so low that an excessive amount of nitrogen enters the liquid phase, then to reheat slightly to remove the excess nitrogen before making the separation.

I claim:

1. The method of preparing for pipeline transportation a gaseous fuel derived from natural gas which comprises passing a mixture derived from natural gas and comprising nitrogen, methane, ethane, propane and at least two hydrocarbons less volatile than propane through a first cooling zone while maintaining said mixture under substantial superatmospheric pressure to cause the formation of a liquid comprising at least a substantial portion of the hydrocarbon material less volatile than propane while leaving in the gaseous phase the bulk of the ethane, methane, and nitrogen; withdrawing at least a portion of said liquid from said first cooling zone through a first passage; withdrawing as a gas from said first cooling zone through a second passage a second mixture comprising nitrogen, methane, and at least one hydrocarbon less volatile than methane; passing said second mixture under substantial superatmospheric pressure through a second cooling zone to cause the formation of a second liquid comprising the bulk of the hydrocarbon material less volatile than methane and a substantial portion of the methane while leaving in the gaseous phase a substantial portion of the methane and the bulk of the nitrogen; separating said second liquid from the remaining gas; passing said separated second liquid in heat exchange relation with another portion of said second mixture whereby at least a substantial portion of said second liquid is converted into vapor; passing said vapor in heat exchange relation with another portion of said first-recited mixture; dividing the gas separated from said second liquid into a plurality of fractions of different nitrogen percentages under conditions of temperature lower than the temperature at which such second liquid is formed; passing at least one of said fractions in heat exchange relation with another portion of said second mixture; and passing at least one of said fractions in heat exchange relation with another portion of said first-recited mixture.

2. The method of claim 1 wherein the mixture passing through the first cooling zone flows upwardly while the liquid formed in the first cooling zone flows downwardly and in the second cooling zone the second mixture flows concurrently with the second liquid.

3. The method of treating a mixture containing methane and nitrogen, said mixtures being derived from natural gas, which comprises cooling said mixture under substantial superatmospheric pressure to liquefy at least a substantial portion of the methane, subjecting the mixture to fractionation to produce a liquid substantially free from nitrogen and a vapor containing substantially all of the nitrogen, dividing the liquid substantially free from nitrogen into a plurality of portions, evaporating a first portion of the liquid substantially free of nitrogen in heat exchange relation with the vapor containing substantially all the nitrogen while maintaining on said first portion a pressure above atmospheric and on the vapor containing substantially all the nitrogen a pressure substantially higher, whereby a nitrogen-rich liquid is caused to form, supplying said nitrogen-rich liquid to said fractionation step as reflux and evaporating a second portion of the liquid substantially free from nitrogen in heat exchange relation with another portion of the mixture containing methane and nitrogen while maintaining on said second portion of liquid substantially free from nitrogen a pressure lower than the pressure being maintained on said mixture, whereby a methane-rich liquid is caused to form, the pressure maintained on said second portion of liquid substantially free from nitrogen during the evaporation thereof being substantially higher than the pressure maintained on said first portion of liquid substantially free from nitrogen during evaporation thereof.

4. The method of treating a mixture containing methane and nitrogen, said mixture having been derived from natural gas, which comprises cooling said mixture under substantial superatmospheric pressure to liquefy at least a substantial portion of the methane; subjecting the mixture to fractionation to produce a liquid substantially free from nitrogen and a vapor containing substantially all the nitrogen; expanding said nitrogen-containing vapor under conditions which insure that the temperature of the vapor immediately after expansion will be lower than the temperatures of said nitrogen-containing vapor as it leaves the fractionation step; supplying part of the refrigeration required to produce reflux for said fractionation step by transfer of heat to said expanded vapor; dividing said liquid substantially free from nitrogen into a plurality of portions; evaporating a first portion of said liquid substantially free from nitrogen, under a pressure higher than atmospheric but lower than the pressure maintained on said liquid during said fractionation step, to supply another part of the refrigeration required to produce reflux for said fractionation step; and supplying part of the refrigeration required for said first-recited cooling step by evaporation of a second portion of said liquid substantially free from nitrogen while maintaining thereon a pressure substantially higher than the pressure maintained on said first portion of liquid substantially free from nitrogen during the evaporation thereof, but lower than the pressure maintained on said liquid during said fractionation step.

5. The method of treating a mixture containing methane and nitrogen, said mixture having been derived from natural gas, which comprises cooling said mixture under substantial superatmospheric pressure to liquefy at least a substantial portion of the methane; subjecting the mixture to fractionation to produce a liquid substantially free from nitrogen and a vapor containing substantially all the nitrogen; expanding said nitrogen-containing vapor under conditions which insure that the temperature of the vapor immediately after expansion will be lower than the temperature of the vapor immediately before expansion; supplying part of the refrigeration required for said first recited cooling step by transfer of heat to said expanded vapor; dividing the liquid substantially free from nitrogen into a plurality of portions; and supplying part of the refrigeration required to produce reflux for said fractionation step by evaporating one of said portions of liquid substantially free from nitrogen under a pressure higher than atmospheric but lower than the pressure maintained on said liquid during said fractionation step.

6. The method of treating a mixture containing methane and nitrogen, said mixture having been derived from natural gas, which comprises cooling said mixture while maintaining the pressure thereon substantially above atmospheric to cause at least a substantial portion of the methane to liquefy; fractionating said mixture under a pressure lower than that employed in the cooling step, but substantially above atmospheric pressure, to produce a liquid substantially free from nitrogen and a vapor containing substantially all the nitrogen; expanding said nitrogen-containing vapor under conditions which insure that the temperature of the vapor immediately after expansion is lower than the temperature of the vapor immediately before expansion; supplying part of the refrigeration required in said first recited cooling step by transfer of heat to said expanded vapor; supplying another part of the refrigeration required in said first recited cooling step by transfer of heat to the liquid being reboiled in the fractionation zone, thereby supplying at least in part the heat required for said fractionation step; dividing the liquid substantially free from nitrogen into a plurality of portions; and supplying at least in part the refrigeration required to produce the reflux for said fractionation step by evaporating one portion of the liquid substantially free from nitrogen under a pressure above atmospheric but substantially lower than the pressure under which said fractionation step is conducted.

7. The method of preparing for pipeline transportation a gaseous fuel derived from natural gas which comprises cooling a mixture derived from natural gas and comprising nitrogen, methane and at least one hydrocarbon less volatile than methane while maintaining said mixture under substantial superatmospheric pressure to cause the formation of a first liquid comprising the bulk of the hydrocarbon material less volatile than methane and a substantial portion of the methane while leaving in the gaseous phase a substantial portion of the methane and the bulk of the nitrogen; separating said first liquid from the remaining gaseous mixture containing methane and nitrogen, while maintaining the pressure substantially above atmospheric; supplying a part of the refrigeration required in said cooling step by evaporating said separated liquid under pressure lower than that maintained on said first-recited mixture during said cooling step; subjecting said remaining gaseous mixture to a second cooling step while maintaining the pressure substantially above atmospheric to cause the formation of a second liquid comprising at least a substantial portion of the methane; fractionating the mixture to produce a liquid substantially free from nitrogen and a vapor containing substantially all the nitrogen, while maintaining the pressure substantially above atmospheric, but substantially below the pressure maintained on the mixture being subjected to the second cooling step; expanding the nitrogen-containing vapor under conditions which insure that the temperature of the vapor immediately after expansion will be lower than the temperature of the vapor immediately before expansion; supplying part of the refrigeration required in said second cooling step by transfer of heat to said expanded nitrogen-containing vapor; supplying another part of the refrigeration required in said second cooling step by transfer of heat to the liquid being reboiled in the fractionation zone, thereby supplying at least in part the heat required for such fractionation step; dividing the liquid substantially free from nitrogen into a plurality of portions; supplying at least in part the refrigeration required to produce the reflux for said fractionation step by evaporating a first portion of the liquid substantially free from methane under a pressure above atmospheric but substantially lower than the pressure under which said fractionation step is conducted; supplying another part of the refrigeration required in said second cooling step by evaporating a second portion of the liquid substantially free from nitrogen under a pressure substantially lower than the pressure under which said fractionation step is conducted, but substantially higher than the pressure maintained on said first portion of liquid substantially free from nitrogen during evaporation thereof; and supplying part of the refrigeration required in said first-recited cooling step by transfer of heat to the gas produced by the evaporation of at least one of said portions of liquid substantially free from nitrogen.

References Cited in the file of this patent

UNITED STATES PATENTS

| Number | Name | Date |
|---|---|---|
| 668,197 | Le Seur | Feb. 19, 1901 |
| 1,497,546 | Claude et al. | June 10, 1924 |
| 1,521,115 | Mewes et al. | Dec. 30, 1924 |
| 1,530,461 | Graham | Mar. 17, 1925 |
| 1,602,535 | Le Rouge | Oct. 12, 1926 |
| 2,122,238 | Pollitzer | June 28, 1938 |
| 2,475,957 | Gilmore | July 12, 1949 |
| 2,487,147 | Latchum | Nov. 8, 1949 |
| 2,500,118 | Cooper | Mar. 7, 1950 |